United States Patent [19]

Hopkins

[11] 3,800,379

[45] Apr. 2, 1974

[54] CUTTING INSERT

[75] Inventor: David Alan Hopkins, Detroit, Mich.

[73] Assignee: The Valeron Corporation, Oak Park (Detroit), Mich.

[22] Filed: Aug. 2, 1972

[21] Appl. No.: 277,276

[52] U.S. Cl. .................................................. 29/95
[51] Int. Cl. ............................................. B26d 1/00
[58] Field of Search........ 29/95 R, 95.3, 95.5, 96 R, 29/95, 96, 95.1

[56] References Cited
UNITED STATES PATENTS

| 3,399,442 | 9/1968 | Jones et al. | 29/95 |
| 2,870,523 | 1/1959 | Richard | 29/96 |
| 3,504,413 | 4/1970 | Siewert | 29/95 |
| 3,559,260 | 2/1971 | Fine | 29/96 |

Primary Examiner—Andrew R. Juhasz
Assistant Examiner—W. R. Briggs
Attorney, Agent, or Firm—Farley, Forster & Farley

[57] ABSTRACT

The invention comprises a cutting insert for providing positive rake cutting action when mounted in a negative rake tool holder. The insert has at least one chip control groove formed in the top face adjacent a side wall. The groove has an outer surface intersecting the side wall at an angle of less than 90° to form a cutting edge. The cutting edge initially extends downwardly along the side wall away from the cutting corner and the face. In the preferred embodiment the groove angularly intersects the adjacent side wall with the maximum groove width adjacent the cutting corner and the outer surface conical in form, the combination creating a chip with a compound curve which is more readily fractured.

21 Claims, 5 Drawing Figures

PATENTED APR 2 1974          3,800,379

3,800,379

1

CUTTING INSERT

BACKGROUND OF THE INVENTION

In recent years a number of cutting inserts have been developed which can be used to provide positive rake cutting action when mounted in a negative rake tool holder, such as shown in U.S. Pat. Nos. 3,399,442 and 3,137,917, eliminating the necessity of positive rake tool holders for certain types of operations. Inserts for positive rake cutting with negative rake tool holders previously developed to date are limited to relatively low feed rates since the higher feed rates tend to break the inserts or produce extremely poor surface finishes.

SUMMARY OF THE INVENTION

The invention comprises an improved chip breaker groove formed in a cutting insert adjacent each cutting corner. In the preferred embodiment, two geometric elements are combined as follows with the result that feed rates may be doubled and insert life greatly improved. The outer surface of the groove intersecting the adjacent side wall to form the cutting edge is conical in form and the groove angularly intersects the adjacent side wall with the widest portion of the groove near the cutting corner. The minor ellipse shape of the cutting edge creates a chip with a compound curve configuration which more readily fractures. The conical surface with increasing radii recedes from the chip substantially eliminating contact until the chip strikes the inner surface of the groove relatively distant from the cutting edge. The increased width of the groove near the cutting corner allows a further increased feed rate in combination with the improved chip flow. Inserts according to the present invention significantly increase the range of applications of this type of insert by allowing surprisingly higher feed rates to be used. These inserts also exhibit the additional advantages of improving surface finishes and in some cases reducing horsepower requirements. Inserts according to this invention can cut at low or high feed rates and simultaneously provide excellent chip control within a wide range of depths of cut.

DESCRIPTION OF THE PREFERRED EMBODIMENT

Figure 1:
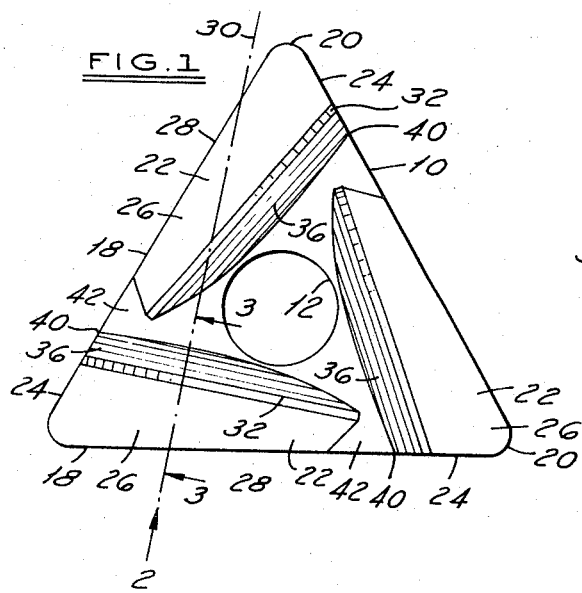
FIG. 1 is a plan view of the top face of a triangular insert according to the present invention.
Figure 3:
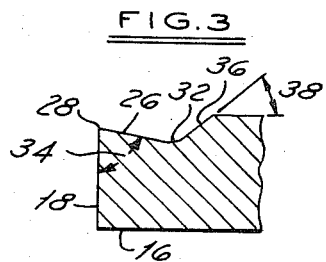
FIG. 3 is a sectional view along the line 3—3 of FIG. 1.
Figure 2:
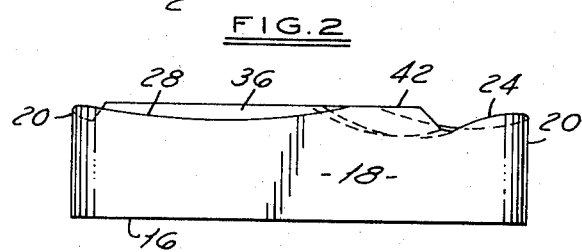
FIG. 2 is a side elevation of the insert of FIG. 1 taken in the direction 2 of FIG. 1.

An indexable triangular insert according to the present invention is illustrated in FIGS. 1 through 3. The insert 10 comprises a body of hard material, preferably tungsten carbide, and may have a central pin receiving hole 12. The insert has a top face 14, bottom face 16, and side walls 18 perpendicular to the faces. A cutting corner 20 is formed at the intersection of each two side walls. The top face 14 has chip control grooves 22, formed therein. The grooves start at each cutting corner and extend along, and adjacent to, each side wall 18. Each groove intersects at 24 the opposite side wall adjacent the cutting corner 20.

Each groove has an outer surface 26 intersecting the adjacent side wall 18 at an angle of less than 90° to form a cutting edge 28. The outer surface 26 and the cutting edge 28 initially extend downwardly along the side wall 18 and away from the cutting corner 20 and the top face 14. In the preferred embodiment as shown in FIG. 2 th cutting edge 28 initially extends downwardly from the cutting corner 20 at an angle of about 5° to 20° with the top face 14. Excellent results have been obtained using an angle of 10°.

As shown in FIGS. 1 and 2, the outer surface 26 is preferably formed as a portion of a conical surface having the cone axis 30 positioned inwardly from the cutting corner (lower left in FIG. 1) and above the top face of the insert. The use of a conical surface causes the outer surface 26 and the cutting edge 28 to be concave toward the upper face 14. The conical surface is positioned with its apex external of the cutting edge such that the radius of curvature of the cutting edge 28 is smaller than the radius of curvature at the bottom 32 of the groove. This configuration of the outer surface 26 directs the chip away from the cut, curves the chip making it easier to break, and decreases heat transfer from the chip to the insert.

As shown in FIG. 3, the outer surface forms an angle 34 with the side wall 18. This angle 34 is preferably 70° to 85° with excellent results being obtained with an angle of about 78°.

The groove 22 also has an inner surface 36 extending downwardly from the top face 14 toward the bottom and the outer surface 26. The inner surface is also preferably formed as a portion of a conical surface having its axis positioned inwardly from the cutting corner. Preferably the axis 30 of the conical surface of the outer surface 26 coincides with the axis of the conical surface of the inner surface with the apex of the inner surface on the opposite side of the insert. The inner surface 36 preferably forms an angle 38 within a range of about 30° to 50° with the top face 14. The particular angle is chosen to provide an included angle between the outer and inner surfaces within a range of about 120° to 140°. Excellent results have been obtained with an angle of about 38° to the top face 14.

The bottom 32 of the groove may be formed with a small neutral region such as the cylindrical surface shown in FIGS. 1–3. This region can alternately be concave, any other suitable configuration, or merely be the intersection of the inner and outer surfaces.

The groove 22 is angularly positioned in the top face 14 with respect to the adjacent side wall 18. In the preferred embodiment, the groove 22 is angularly positioned about 5° to 20° from parallel with the adjacent side wall 18 and the widest part of the groove is nearest the cutting corner 20 as clearly shown in FIG. 1. Excellent results have been obtained with the groove 10° from parallel in such a manner.

The relationship of the width of the groove 22 at the cutting corner to the length of the groove is critical in relation to the results produced. The width of the groove should be about 0.2 to 0.45 times the length of the groove, the width being measured at the point 40 where the inner surface intersects the top face 14 and the side wall 18 and parallel to the cone axis 30. The best results have been provided using a groove width which is about 0.4 times the length of the bottom 32 of the groove.

Figure 4:
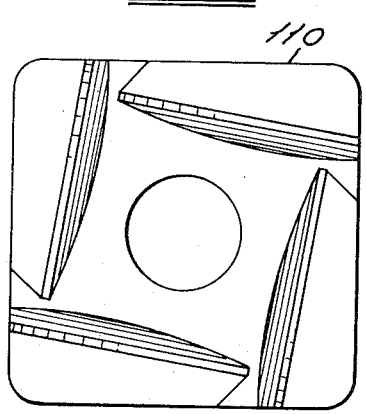
FIG. 4 is a plan view of the top face of a square insert.
Figure 5:
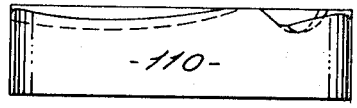
FIG. 5 is a side elevation of the square insert shown in FIG. 4.

The chip control groove 22 according to the present invention can be used in any style or geometry of negative rake insert such as the square insert 110 shown in FIGS. 4 and 5. When more than one groove is provided in the face of a polygonal indexable insert the grooves do not intersect, but rather (as shown in the drawings) a support surface 42 is maintained on each side of the face which stabilizes the insert and allows grooves to be put in both top and bottom (not shown) faces. The grooves are preferably positioned in the face 14 to locate the cutting corner 20 below the plane of the face (as shown in FIG. 2) and thereby protect the corner 20 and improve chip breaking action.

As shown in FIG. 3 the inner 36 and outer 26 surfaces of the groove 22 can be straight in cross-section as in the conical configuration shown or they may be concave toward the face if desired. With the conical insert surfaces the curved chip shape generated has minimal contact with the outer surface and therefor substantially reduces abrasion and heat transfer to the insert. The heat retained in the chip significantly decreases welding, cratering, and chip jam-up.

As an example, each groove in a triangular insert one inch on a side may be prepared accordingly as follows: A double conical grinding wheel 2.750 inches in diameter with 12° and 38° coaxial cones corresponding to the outer and inner surfaces is positioned coaxially with line 30 in FIG. 1, line 30 being parallel to the upper face of the insert, 10° from perpendicular to the adjacent insert side wall and 0.190 inches from the axis of the central pin hole 12. The grinding wheel includes a 0.016 inches wide cylindrical surface at the intersection of the cones and forms the groove bottom 32. The grinding wheel is positioned to form the bottom 32 at 0.200 inches from the axis of the central pin hole 12 and the insert is ground to a groove depth of 0.005 inches below the top face at the cutting corner.

One-half inch I.C. triangular tungsten carbide inserts according to the present invention were used in turning 1045 steel at feed rates varying from 0.0075 inch to 0.03 inch per revolution and depths of cut ranging from 0.05 inch to 0.375 inch. The same half inch I.C. inserts at similar feed rates and depths of cut were used to machine 6061-T6 aluminum, 1018 and 4140 steel, 316 stainless steel, and a titanium base alloy. Five-eights I.C. inserts were also tested under similar conditions. METCUT specifications for surface speed were used for almost all cuts. The inserts exhibited excellent chip control and provided good surface finish in all cases.

Other positive cutting action negative rake inserts presently available were tested under the same conditions and produced acceptable results only at feed rates below 0.012 inch per revolution. At higher feed rates the prior art inserts either broke or produced extremely poor surface finishes. Inserts according to the present invention accordingly have been found to provide significant increases in the range of applications of positive rake inserts for negative rake tool holders with improved surface finishes.

I claim:

1. A cutting insert, comprising;
a body having parallel top and bottom faces, sidewalls joining said faces, and at least one cutting corner formed at the intersection of two sidewalls, at least one of said faces having a chip control groove formed therein extending from the cutting corner longitudinally and adjacent to one of said sidewalls, said groove having an outer surface of conical form intersecting said adjacent sidewall to form a cutting edge, and said outer surface having the radius of curvature of said conical form increasing in the direction of cutting chip flow provided by said conical outer surface axis being positioned inwardly from said cutting corner and above said face.

2. A cutting insert, comprising;
a body having parallel top and bottom faces, sidewalls joining said faces, and at least one cutting corner formed at the intersection of two sidewalls, at least one of said faces having a chip control groove formed therein extending longitudinally from the cutting corner and adjacent to one of said sidewalls, said groove having an outer surface intersecting said adjacent sidewall to form a cutting edge, said groove extending angularly relative to said adjacent sidewall, and said outer surface having an axis positioned inwardly from said cutting corner above said face and a radius of curvature increasing in the direction of cutting chip flow.

3. A cutting insert, comprising:
a body having parallel top and bottom faces, sidewalls joining said faces, at least one cutting corner formed at the intersection of two sidewalls, at least one of said faces having a chip control groove formed therein extending longitudinally from the cutting corner and adjacent to one of said sidewalls, said groove extending angularly relative to said adjacent sidewalls and having an outer surface of conical form intersecting said adjacent sidewall to form a cutting edge, said outer surface having the radius of curvature of said conical form increasing in the direction of cutting chip flow provided by said conical outer surface axis being positioned inwardly from said cutting corner and above said face.

4. The cutting insert of claim 3 wherein said outer surface intersects said adjacent side wall at an angle of less than 90° and at least a portion of said cutting edge extends downwardly along said adjacent side wall away from said cutting corner and said face.

5. The insert of claim 4 wherein said groove is widest adjacent said intersection with said opposite side wall.

6. The insert of claim 5 wherein said groove extends angularly about 5° to 20° relative to said adjacent side wall.

7. The insert of claim 5 wherein said groove extends angularly about 10° relative to said adjacent side wall.

8. The insert of claim 4 wherein said outer surface intersects said adjacent side wall at an angle of 70° to 85°.

9. The insert of claim 4 wherein said outer surface intersects said adjacent side wall at an angle of 78°.

10. The insert of claim 4 wherein said cutting edge initially extends downwardly at an angle of 5° to 20° with said face.

11. The insert of claim 4 wherein said cutting edge initially extends downwardly at an angle of 10°.

12. The insert of claim 3 wherein said groove has an inner surface extending downwardly from said face.

13. The insert of claim 12 wherein said inner surface is of conical form having the cone axis positioned inwardly from said cutting corner and above said face.

14. The insert of claim 12 wherein the angle formed between intersecting elements of said outer and inner surfaces is about 120° to 140°.

15. The insert of claim 14 wherein said angle between said intersecting elements of said inner and outer surfaces is about 130°.

16. The insert of claim 3 wherein the insert is polygonal and has a chip control groove formed along each edge of at least one face.

17. The insert of claim 3 wherein the maximum width of said groove adjacent said cutting corner is about 0.2 to 0.45 times the length of the groove.

18. The insert of claim 17 wherein the width of said groove is about 0.4 times the length of the groove.

19. The insert of claim 3 wherein said cutting corner is below the plane of said face.

20. A cutting insert, comprising;
a body having top and bottom faces, sidewalls joining said faces, and at least one cutting corner formed at the intersection of two sidewalls,
at least one of said faces having a chip control groove formed therein extending from the cutting corner,
said groove having an outer surface of conical form with the radius of curvature of said conical form increasing in the direction of cutting chip flow provided by said conical outer surface axis being positioned inwardly from said cutting corner and above said face.

21. A cutting insert, comprising;
a body having at least a top face, a cutting corner and a chip control groove formed in said top face and extending from said corner, said chip control groove having an outer surface of conical form with the radius of curvature of said conical form increasing in the direction of cutting chip flow and provided by said conical outer surface being positioned inwardly from said cutting corner and above said face.

* * * * *

PO-1050
(5/69)

UNITED STATES PATENT OFFICE
CERTIFICATE OF CORRECTION

Patent No. 3,800,379          Dated April 2, 1974

Inventor(s) DAVID ALAN HOPKINS

It is certified that error appears in the above-identified patent and that said Letters Patent are hereby corrected as shown below:

Claim 21, line 8, after "surface" insert the word --axis--

Signed and sealed this 8th day of October 1974.

(SEAL)
Attest:

McCOY M. GIBSON JR.          C. MARSHALL DANN
Attesting Officer          Commissioner of Patents